June 19, 1923.

C. W. HART 1,458,936

METHOD OF HARVESTING GRAIN

Filed Jan. 27, 1919

Witness
F. A. Otto

Inventor
Charles W. Hart
By Erwin & Wheeler
Attorneys

June 19, 1923.

C. W. HART

METHOD OF HARVESTING GRAIN

Filed Jan. 27, 1919

Inventor
Charles W. Hart
By Erwin E. Wheeler
Attorneys

Witness
F. A. Otto

June 19, 1923.

C. W. HART

METHOD OF HARVESTING GRAIN

Filed Jan. 27, 1919

Inventor
Charles W. Hart
By Erwin & Wheeler
Attorneys

Witness

Patented June 19, 1923.

1,458,936

UNITED STATES PATENT OFFICE.

CHARLES W. HART, OF CHARLES CITY, IOWA.

METHOD OF HARVESTING GRAIN.

Application filed January 27, 1919. Serial No. 273,375.

*To all whom it may concern:*

Be it known that I, CHARLES W. HART, a citizen of the United States, residing at Charles City, county of Floyd and State of Iowa, have invented new and useful Improvements in Methods of Harvesting Grain, of which the following is a specification.

My invention relates to improvements in methods of harvesting grain. Heretofore three methods have been prevalent in the United States, which may be briefly described as follows:—

First, the method of cutting and binding the grain in sheaves or bundles to be subsequently stacked, or in some cases set up in shocks, for a preliminary curing, after which the bundles are conveyed by wagons from the field in which they are shocked to a barn or stack, for a further curing period, and to await the thrashing operation. This method is followed chiefly in the eastern States, and plains States, where rain fall is abundant, and where the straw and grain contains considerable quantities of moisture, even when apparently ripe and dry.

Second, the combined heading and thrashing process, in which the heads, with such short sections of straw as may be necessary on account of the varying length of the stems, are allowed to fall upon a conveyor carried by the harvester, which delivers them directly to a threshing machine traveling with the harvester, and which receives and threshes the grain as fast as it is cut. This method is followed principally upon the Pacific slope, where the prevalence of well defined wet and dry seasons, (the grain ripening during dry seasons), makes it possible to harvest the ripe grain, the moisture having been extracted to such an extent that the grain will not heat in the granary.

Third, the method followed in the so-called plateau district, comprising a belt about five hundred miles wide, lying to a large extent east of the Rocky Mountain range, and in which district the rain fall is scanty, but distributed largely thruout the entire crop growing period. In this district, the straw is apt to be short, and bundling operations are expensive and unnecessary, for the reason that preliminary curing in shocks is not required, altho the grain and straw contains sufficient moisture to require curing the stacks before threshing. The common practice under these conditions, has therefore been to harvest the grain with so-called headers, and to deliver the grain from the header into wagons which operate in a series to receive and convey the grain from the header to points selected for stacking, where it is stacked and allowed to cure. Such harvesting operations require a force of about six men, and several wagons and teams of horses, but the harvesting operation is rapid and the necessary curing is successfully accomplished in the stack, except in cases where, as quite often happens, the interior of the stack is saturated by rain, the straw having become tangled and irregularly massed, due to repeated handling on the wagon and on the stack. This method of harvesting frequently results in large waste, owing to the prevailing high winds which sweep the grain from the wagons, and from the uncompleted stacks, and also owing to the losses which result from successive handling, and the shelling which is exceedingly prevalent under the climatic conditions which permit of heading operations.

My invention pertains more particularly to the third class of harvesting operations above mentioned, and is based upon the discovery of a method by which the grain may be delivered directly from the sickle to the stack, without intermediate handling, thereby enabling me to avoid loss, to protect the stack from wind while in process of construction, to dispense with the wagon and horses, and with the large force of men heretofore employed, and to produce stacks which afford better protection from the rain.

I have further discovered that by following my improved method, it is possible to stack the grain with the straw butts exposed or projecting outwardly and downwardly on all sides of the stack in water shedding position, the central portion being properly crowned to secure the proper slope at the sides when the stack has settled, and thus protect the heads from the elements, notwithstanding prolonged periods of rain fall, or excessive rain fall.

My improved method is made possible by employing the large power units now being manufactured for agricultural purposes, such, for example, as the so-called tractors, which are now obtainable in units having thirty, forty, or even greater horse power. I have found that these tractors have sufficient power to draw a stack containing barge with a stack therein, the barge being of such size that an entire stack of normal dimensions may be carried thereby.

I have also found that it is possible to connect a header or grain harvesting machine at one side of such a barge, in such a manner that the cut grain will fall upon the conveyor, and be delivered thereby directly onto the stack within the barge, with the straws substantially parallel, and the heads generally projecting in one direction, i. e., rearwardly.

With the arrangement and organization above described, one man can build the stack within the barge, and by allowing the material to accumulate at the delivery end of the conveyor in bunches, or loose bundles, of sufficient size to facilitate manipulation with a fork, it is possible for a man to stack this grain in such a manner that the butts of the straw will project outwardly on all sides of the stack, and pitch downwardly in such a manner as to make a perfect thatch. This cannot be done when following the former method of heading and stacking. The center of the stack in my improved method is maintained with a substantial crown, made solid by tramping in a manner well known to experienced farmers.

By placing a cable or rope within the barge, and supporting it along the side walls thereof at a substantial distance above the floor, and with its ends projecting from the rear margins of the respective walls, I am able to deliver the completed stack from the barge by merely anchoring the ends of the cable to the ground, and then drawing the barge forwardly by means of the tractor, until its floor has been drawn from under the stack. To facilitate this delivery operation, I preferably provide the floor of the barge with a set of parallel longitudinally extending bars or skid-ways, which support the stack above the floor, and which preferably extend rearwardly for a short distance from the floor of the barge.

I have further found that with the above described arrangement and proper connections between the tractor, the barge, and the header, square corners may be turned without stopping or backing the tractor, since it is possible to so locate the barge with reference to the tractor that the header, being at one side of the barge, will swing backwardly when a corner is being turned, and by the time the tractor has completed the turn, the sickle will be parallel with the line along which it has previously traveled, and will be located in the space previously cut, the sickle being therefore ready to move forwardly at right angles to said previous line of travel.

It is thus possible to cut a field of grain in such a manner as to produce a row of stacks in close proximity to each other, each stack representing an accumulation of grain in the barge secured by one or more circuits of the field.

My improved method is more particularly explained with reference to the drawings, in which—
Figure 1 is a side elevation of a portion of a tractor, with a so-called barge operatively connected therewith, and viewed from the side opposite that at which the header is located.
Figure 2 is a rear elevation of the barge and header.

Figure 1:
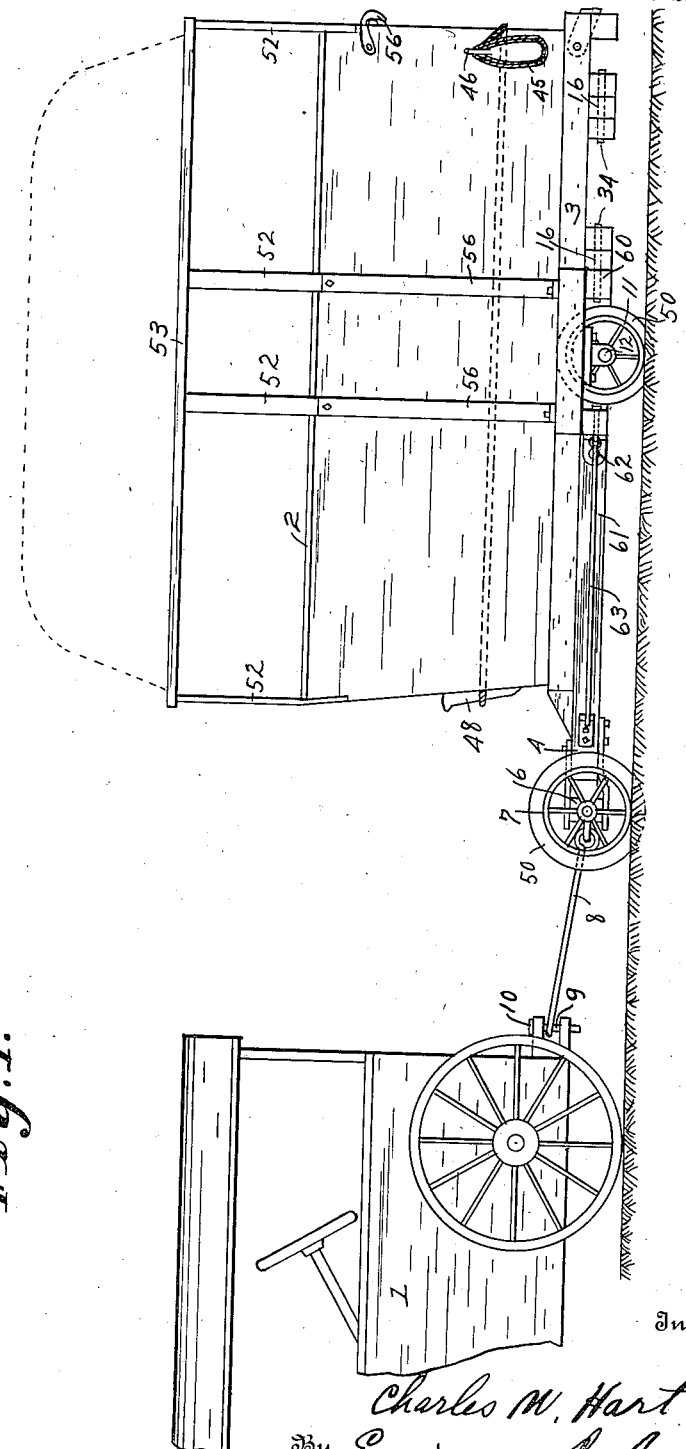
Figure 3:
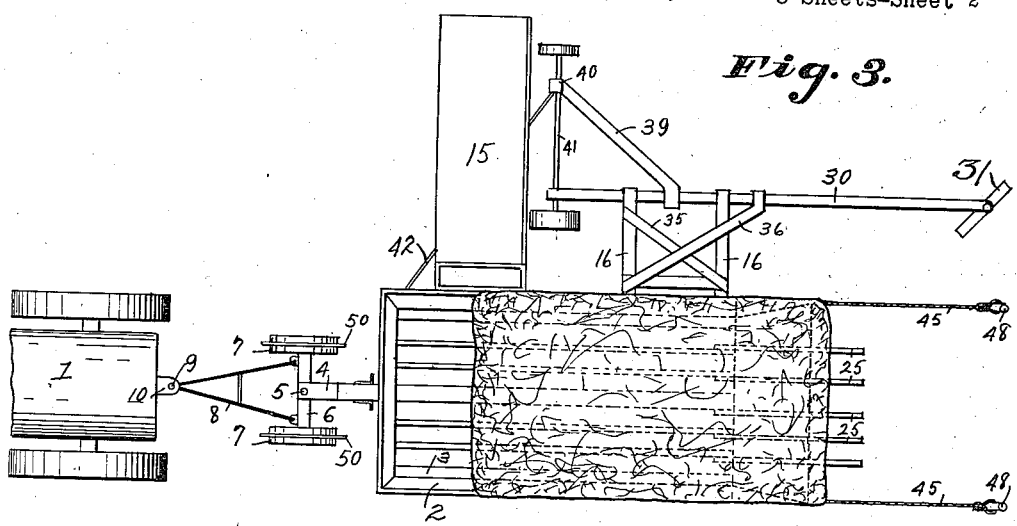
Figure 3 is an outline view of the tractor barge and header, with the cable ends anchored to the ground, and the barge in process of withdrawal from the stack.

Like parts are identified by the same reference characters thruout the several views.
In the drawings, 1 is a power unit, which may be assumed to be a tractor of ordinary construction. The barge comprises a large rectangular box 2, mounted upon a frame 3, having a projecting beam or reach 4, pivotally connected by an ordinary king bolt 5, with a front axle 6 supported by the front wheels 7. A tongue 8 projects forwardly from the front axle, and is pivotally connected at 9 with the draw bar 10 projecting rearwardly from the tractor.

The rear wheels 11 are located at the sides of the barge, and are journaled upon rear axles 12, of any ordinary type. The header 15 may also be of ordinary type, but its frame is flexibly connected with the barge frame by a set of projecting bars or beams 16. The header has the ordinary apron conveyor 17, provided with an upwardly inclined delivery portion 18, which projects over one side margin of the box 2.

The box 2 preferably has a rear wall 20, altho this is not essential. In the construction shown, the bottom of the box 2 is provided with a series of parallel skids 24, to the rear ends of which the studs 25 of the rear wall are pivoted, in such a manner that the rear wall may be swung downwardly in the form of an extension, down which the stack may slide after it has been erected upon the skids 24, as hereinafter explained.

Figure 4:
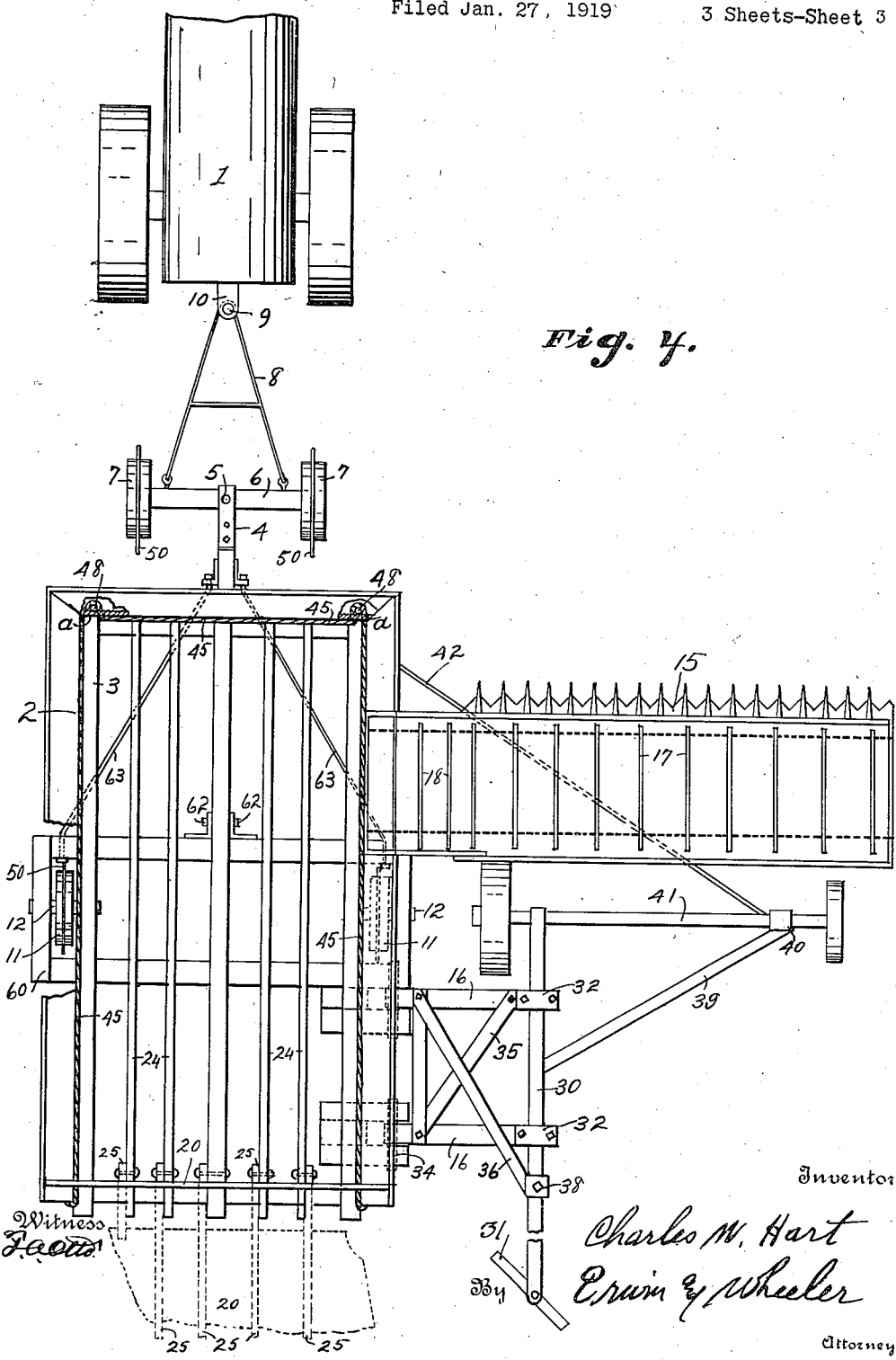
Figure 4 is a general plan view of the barge and header.

The ordinary header is provided with a push rod or beam 30, having a caster wheel 31 at its rear end. I utilize this push beam or rod 30 as a means for connecting the link bars 16, the outer ends of which have bearing members 32, adapted to encircle the push rod or beam 30, the latter being cylindrical in form. The inner ends of these link bars 16 are pivoted to the frame of the barge, as indicated at 34. 35 is a brace bar, and 36 is a combined brace and draw bar, bolted to the bar 30 at 38. 39 is a brace of the type commonly used to reinforce the header frame, this being clamped at 40 to the axle 41. For my purposes, I prefer to employ a tension rod 42, which connects the front end of the barge frame with the clamping member 40, the tension rod passing underneath the platform of the header. A cable may be substituted for this rod. A rope or cable 45 is employed for the purpose of delivering a completed stack to the ground by first anchoring the stack to the ground, and then withdrawing the barge by means of the tractor. Preparatory to erecting the stack, the cable or rope 45 is secured in position along the front and side walls of the barge, with the ends of the cable projecting at the rear margins of the side walls, and preferably hung upon any suitable support, such, for example, as the hooks 46. I prefer to secure the cable to the front wall of the barge at two points adjacent to the side walls, or front corners of the barge, by passing it thru suitable slots to form an exterior loop, as indicated at a, in Figures 2 and 4, whereupon, by inserting the stakes 48 thru these loops, the rope may be supported in the desired elevated position within the barge, and caused to follow the interior walls thereof. The anchor stakes 48 are utilized to retain the cable in the slots as indicated at a. These stakes are removed when it is desired to deliver the stack to the ground and are inserted through loops formed at the rear ends of the rope and driven into ground. The removal of the stakes from the loops a releases the middle portion of the rope, and when the stakes are driven into the ground through the loops 45 at the rear ends of the rope the looped portions at a will be free to withdraw through the slot as the barge moves forwardly, but the rope will then be in a position in which it encircles the stack and the latter will, therefore, be anchored by the stakes while the barge is being withdrawn. By using the anchor stakes to retain the rope loops at a, while the stack is being built, it becomes necessary to remove the stakes from the loop before the stack can be anchored.

Figure 2:
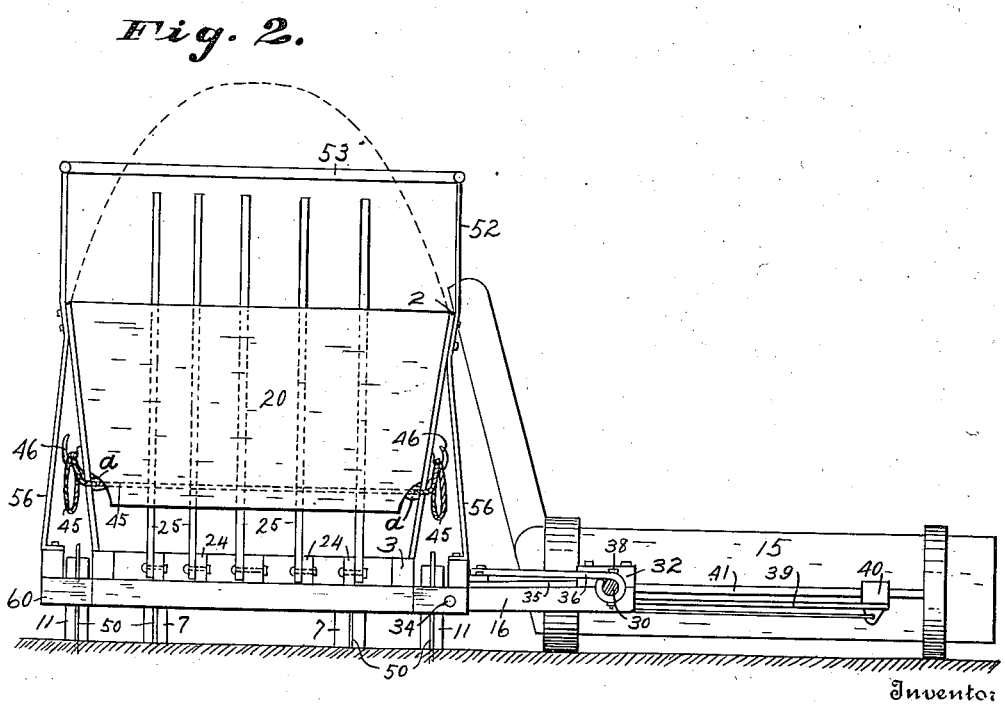

I preferably provide the wheels with steering rings 50, in order to prevent them from skidding under the side strain exerted upon the barge by the header, when the latter is in operation. I also preferably provide the walls of the barge with extension posts 52, and top rails 53, from which curtains may be hung to protect the upper portion of the stack during high winds. It will also be observed that the side walls of the barge preferably converge downwardly, as best shown in Figure 2, whereby a stack may be erected, having its largest diameter substantially at the middle of the height thereof. Braces 56 support the upper margins of the side walls from the outer portions of the barge frame.

The bottom of the barge frame is provided with an axle frame 60, in which the axles 12 are journaled, this frame being rigidly connected with the box. It is provided with a forward extension 61, pivoted at 62 to a sub-frame comprising substantially the beam or reach 4, and strut rods 63, the box being otherwise unconnected with this sub-frame. This arrangement allows the box to tilt downwardly at its rear end, the front end being tilted up from the sub-frame to facilitate delivery of the stack. The wheels 11 are located far enough back of the center of gravity of the box when either empty or filled to enable the box to maintain itself in a horizontal position, except during the period while the stack is being delivered, or preparatory to that period while the tension of the rope 45 is being exerted to hold the stack in an anchored position, and allow the barge to be drawn from beneath it.

In operation, the tractor is utilized to draw the barge along the side of the field of grain to be cut, the header being propelled by the draw bars and tension rods 36 and 42, and being held in proper position with reference to the barge, by the parallel spacing bars 16 which operate as link bars, the structure thus having sufficient flexibility to allow the header and barge to conform independently to the inequalities of the surfaces over which they pass. The arrangement is also such as to allow the header to be tilted to cut the grain at the desired height. The connection of the bar 36 at 38 is sufficiently loose so that it will not interfere with these movements.

With the described arrangement of the parts, the cut grain will, of course, fall rearwardly upon the apron 17, the header being equipped with a reel, (not shown), such as are invariably used. The grain will therefore be carried to the barge with the straws in generally parallel position, and the heads projecting rearwardly. The person within the barge will allow the straw to accumulate in proper sized bundles, or bunches, and will then place it manually so as to construct a stack therein of a size equal to the dimensions of the barge, and properly thatched by arranging the straw with the butts outwardly at the sides and ends of the stack. Upon completion of the stack, the ends of the rope 45 will be released, carried rearwardly and anchored to the ground by the stakes 48. The latches 56 which hold the upper portions of the rear wall will be released, and this wall swung downwardly, as indicated by dotted lines in Figure 5, the tractor being preferably stopped during this operation. Thereupon, the tractor will be again started, and the barge withdrawn from beneath the stack, the latter sliding down the then inclined skids 24, and the auxiliary skids furnished by the studs 25 on the rear wall. The stack may thus be delivered with no material disturbance to the arrangement of the straw or the integrity of the stack as erected within the barge. The apparatus is then ready for a renewal of the stack building operation.

I claim:—

1. The method of harvesting grain, consisting in actuating a stack supporting receptacle along one side of the standing grain to be harvested, cutting said grain and delivering the same directly and continuously into said receptacle, manually stacking said grain within said receptacle, providing an inclined way at the rear end of the receptacle from its floor to the ground and withdrawing the receptacle and said inclined way from beneath the stacked grain.

2. The method of harvesting grain, consisting in simultaneously actuating a stack support and a header, with the header in position for a grain cutting operation, utilizing the header conveyor to deliver the grain to the stack support, with the straws in substantially the parallel relation to each other in which they fall from the sickle, manually stacking the grain upon said support with the butts outwardly at the margins of the stack, bringing the stack to rest, adjusting the rear wall of the receptacle to form an inclined skidway, connecting the stack to a fixed ground anchorage and subsequently withdrawing the support from beneath the stack.

3. The method of harvesting grain, consisting in simultaneously drawing a stack support and a header thru the field, with the header in position for operation upon the standing grain, and with its conveyor in position for delivery of the cut grain to the stack support, protecting the grain upon the stack support from wind, and building a stack within the shelter of said protection, anchoring the completed stack to the ground, and withdrawing the support and shelter.

4. The method of harvesting grain consisting in drawing a stack support along a field of standing grain, propelling a grain cutter from the stack support and delivering the cut material thereto, building a stack of said material upon the support within an anchoring member which passes about the front and sides of the stack, bringing the support to rest when the stack is completed, connecting the anchoring member fixedly to the ground, and moving the stack support forwardly to withdraw it from beneath the stack.

5. The method of harvesting grain consisting in progressively cutting grain along a path of travel and delivering the same laterally, simultaneously moving a stack support along said path in a position to receive the cut grain, building a stack thereon, bringing the support to rest, connecting the bottom portion of the stack along its front and sides with a fixed ground anchorage, and withdrawing the support from beneath the stack.

6. The method of harvesting grain consisting in cutting and stacking the grain upon a moving support having raised enclosing walls on all sides, bringing the support to rest after completing the stack, swinging the wall at one side of the stack downwardly to form an inclined skidway leading to the ground, connecting the stack on the other three sides with a fixed ground anchorage, and then withdrawing the support.

In testimony whereof I affix my signature in the presence of two witnesses.

CHARLES W. HART.

Witnesses:
LEVERETT C. WHEELER,
O. C. WEBER.